United States Patent [19]

Cira

[11] Patent Number: 4,997,327
[45] Date of Patent: Mar. 5, 1991

[54] TOGGLE BOLT ASSEMBLY

[76] Inventor: James L. Cira, Suite 840, 1110 Vermont Ave., NW., Washington, D.C. 20005

[21] Appl. No.: 73,871

[22] Filed: Jul. 15, 1987

Related U.S. Application Data

[63] Continuation of Ser. No. 785,829, Oct. 9, 1985, abandoned, which is a continuation-in-part of Ser. No. 715,327, Mar. 25, 1985, abandoned, which is a continuation-in-part of Ser. No. 666,007, Oct. 29, 1984, abandoned.

[51] Int. Cl.$^5$ ............................................. F16B 21/00
[52] U.S. Cl. .................................... 411/340; 411/342; 411/437
[58] Field of Search ................. 411/73, 337, 340, 341, 411/342, 343, 344, 345, 346, 437, 546, 71

[56] References Cited

U.S. PATENT DOCUMENTS

| | | |
|---|---|---|
| 1,108,922 | 9/1914 | Mensen ................. 411/346 |
| 1,360,200 | 11/1920 | Dowd . |
| 2,024,871 | 12/1935 | Parsons ................. 411/342 |
| 2,120,577 | 6/1938 | Schulte ................. 411/73 |
| 2,149,719 | 3/1939 | Arnest ................. 411/437 X |
| 2,398,220 | 4/1946 | Gelpcke ................. 411/342 |
| 2,567,372 | 9/1951 | Gelpcke ................. 411/342 |
| 2,609,723 | 9/1952 | Stubbs . |
| 2,908,196 | 10/1959 | Apfelzweig ................. 411/344 |
| 3,083,796 | 4/1963 | Bell ................. 411/546 X |
| 3,285,118 | 11/1966 | Elkins ................. 411/346 |
| 3,288,014 | 11/1966 | Mortensen ................. 411/344 |
| 3,389,631 | 6/1968 | Vaillancourt ................. 411/346 |
| 3,513,746 | 5/1970 | Forsberg ................. 411/346 |
| 3,967,049 | 6/1976 | Brandt ................. 411/337 X |
| 4,286,497 | 9/1981 | Shamah ................. 411/345 X |
| 4,289,062 | 9/1981 | Schiefer ................. 411/340 X |
| 4,392,763 | 7/1983 | Brown ................. 411/342 |
| 4,432,683 | 2/1984 | Polos ................. 411/342 X |
| 4,563,118 | 1/1986 | Liljedahl ................. 411/71 |

FOREIGN PATENT DOCUMENTS

| | | | |
|---|---|---|---|
| 223792 | 3/1962 | Austria . | |
| 862436 | 2/1971 | Canada ................. 411/437 | |
| 1028629 | 2/1953 | France ................. 411/437 | |
| 46-5649 | 6/1965 | Japan ................. 411/337 | |
| 591949 | 9/1947 | United Kingdom . | |
| 2001148 | 1/1979 | United Kingdom . | |

Primary Examiner—Rodney M. Lindsey
Attorney, Agent, or Firm—Beveridge, DeGrandi & Weilacher

[57] ABSTRACT

A bushing cooperates with a bolt and a winged toggle member to form a toggle bolt assembly. The bushing has a maximum cross-sectional dimension substantially equal to the diameter of the hole in the wall or other support member to which the toggle bolt assembly is to fasten an object and an inside diameter permitting passage of the bolt therethrough. To fasten an object to a wall, the bolt is passed through an opening in the object and through the bushing and threadedly engaged in the toggle member. The toggle member wings are folded, and the toggle member is passed through the hole in the wall until the wings open. The bushing is inserted into the hole and held in place while the bolt is pulled outward until the opened toggle wings abut the inner surface of the wall, inhibiting rotation of the toggle member as the bolt is rotated. The bolt is then threadedly tightened in the toggle member, drawing the object and the wings into further engagement with the opposite surfaces of the wall.

28 Claims, 5 Drawing Sheets

TOGGLE BOLT ASSEMBLY

This application is a continuation of application Ser. No. 785,829 filed Oct. 9, 1985, now abandoned, which was a continuation-in-part of application Ser. No. 715,237 filed Mar. 25, 1985 and now abandoned, which, in turn, was a continuation-in-part of application Ser. No. 666,007 filed Oct. 29, 1984 and now abandoned.

BACKGROUND OF THE INVENTION

The present invention pertains to toggle bolts. More particularly, the present invention pertains to a toggle bolt assembly having a retainer bushing for preventing pivotal motion or "wobbling" of the bolt during and after installation of the assembly to mount an object on a wall or other support member. In certain embodiments, the retainer bushing includes means resulting in restraining rotation of the winged toggle member as the threaded bolt member is rotated to thread the bolt member into the toggle member. Thus, the bolt member can be driven by a powered screwdriver. Further, the retainer bushing of the present invention assures that the threaded bolt is positioned substantially at the center of the mounting hole. As a consequence, the retainer bushing also facilitates mounting of large objects which require more than one toggle bolt assembly to secure them to a wall, since the ability to closely center the threaded bolts within their respective holes permits easy alignment of the plural toggle bolt assemblies. The retainer bushing additionally results in a more aesthetically pleasing appearance to a fully installed toggle bolt assembly on the wall or other support surface.

Toggle bolts have been utilized for many years to mount objects on a wall or other support surface; however, several problems exist with prior art toggle bolts. First of all, in many applications, it is highly desirable that the toggle bolt be restricted from pivotal movement with respect to the wall during installation of the bolt. It is likewise desirable that the bolt be restricted from pivotal movement after installation is completed. Second, in installing many prior art toggle bolts, it is often necessary to pull the toggle bolt outwardly while turning it, in order to hold the toggle wings against the interior surface of the wall on which the toggle bolt is being installed so as to prevent the winged toggle member from rotating. Such installation is cumbersome and slow. Further, because the hole through which the winged toggle member is inserted through the wall is, of necessity, larger than the thread diameter of the bolt, the bolt may end up tightened off-center in the hole, with the result that the object being mounted is not positioned exactly as desired. Although this mis-positioning may involve only a small fraction of an inch, it can detract from the appearance or adversely affect the operation of the mounted object. Additionally, in applications where more than one toggle bolt is to be utilized to fasten an object to a wall, even small mis-positioning of the several toggle bolts can prevent proper installation. Consequently, confinement of each bolt to a predetermined position within its hole and perpendicular to the plane of the wall is necessary to properly align the several toggle bolt assemblies. Also, in many applications of toggle bolts, it is desirable that following installation of the toggle bolt, the wall and mounted bolt present an aesthetically pleasing appearance.

Although improvements, even quite recently, in toggle bolts have been made, these improvements have not completely eliminated the foregoing problems. Examples of such prior toggle bolt assemblies are shown in U.S. Patent Nos. 4,392,763, 3,389,631, and 2,024,871. The toggle bolt assembly of U.S. Pat. No. 4,392,763 includes a spool piece having a leg extending axially therefrom and having a central bore for passage of a threaded bolt therethrough. This assembly suffers from a number of shortcomings. The leg requires that the cavity or open area behind the wall be of a depth to permit insertion of the leg. On the other hand, there is nothing to prevent the spool from passing completely through the hole in the wall and falling within the cavity. The toggle bolt assembly of U.S. Pat. No. 3,389,631 has a resilient plug member which is tapered to fit snuggly into the hole in the wall. The threaded toggle member includes a pair of hooks which penetrate the plug member. As a consequence, if it is no longer desired to use the toggle bolt, the threaded bolt member can be taken out, but the plug and the toggle member cannot be removed without undue effort, such as drilling out the plug and the pair of hooks. U.S. Pat. No. 2,024,871 shows a toggle bolt having a sleeve which snuggly engages the hole through the wall, but the sleeve is of considerably greater diameter than the bolt, and so the bolt can pivot or wobble within the sleeve and may end up mounted off center within the mounting hole.

SUMMARY OF THE INVENTION

The present invention is an improved toggle bolt assembly for insertion into a mounting hole through a wall or other support member to fasten an object to the wall or support member, while overcoming shortcomings of toggle bolt assemblies known to the prior art. A toggle bolt assembly in accordance with the present invention includes a bushing member having a tubular body portion with a maximum external cross-sectional dimension substantially the same as the diameter of the mounting hole and having a flange portion extending radially from one end of the body portion with a maximum cross-sectional dimension greater than the diameter of the mounting hole. A central bore passes longitudinally through the bushing member to receive a threaded bolt having a diameter substantially equal to the internal diameter of the central bore. A winged toggle member threadedly engages the bolt. When the toggle member has its wings folded, the toggle member can pass through the hole in the wall. The toggle member wings are allowed to open, and the bushing is then positioned in that hole with the flange portion abutting the wall. The bushing centers and stabilizes the bolt, preventing pivoting and wobbling, and the bushing flange prevents the bushing from falling through the hole and aids the aesthetic appearance.

The external cross-section of the bushing member body portion can be substantially circular or can be non-circular, including, for example, a fluted cross-section or a cross-section having a circular main portion with radially extending ribs that run longitudinally along the main portion. If desired, each end of the bushing central bore can have a radially inwardly extending flange or lip to snap or thread onto the bolt. Likewise, if desired, the bushing body portion can be tapered to aid in insertion into the mounting hole.

The retainer bushing can include a restraining portion which engages the threaded bolt so that with the winged toggle member threadedly engaged on the bolt, with the retainer bushing inserted into the hole in the wall and its flange portion engaging the exterior surface of the wall, and with the toggle member wings in their open position, the restraining portion assures that the winged toggle member is restrained from rotation as the threaded bolt is rotated, even if force is exerted to urge the bolt head toward the wall exterior surface, as during use of a powered screwdriver, a Yankee screwdriver, or a powerdriver.

Both during and after installation of a toggle bolt assembly in accordance with the present invention, pivoting or wobbling of the bolt member is inhibited since movement of the bolt member with respect to the wall is restricted to only that motion necessary either to install or to remove the toggle bolt assembly. In addition, the toggle bolt assembly provides an aesthetically pleasing appearance as to any exposed portions of the assembly.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF PREFERRED EMBODIMENTS OF THE INVENTION

Figure 1:
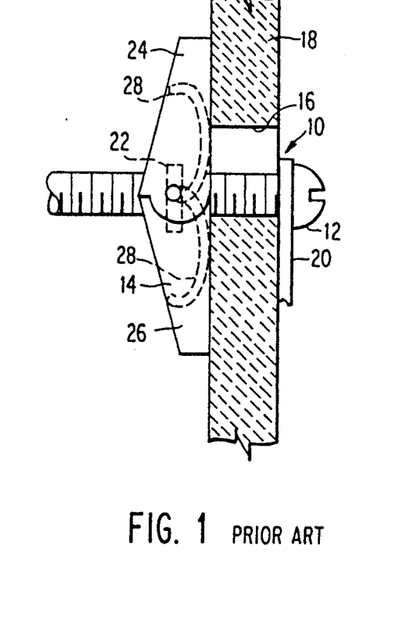
FIGS. 1 and 2 are cross-sectional views depicting a prior art toggle bolt assembly fastened in a wall or other support member.

FIG. 1 depicts a prior art toggle bolt assembly 10, including bolt member 12 and winged toggle member 14, installed in an opening or mounting hole 16 in a wall or other support member 18. Toggle bolt assembly 10 is depicted as holding an object 20 on wall 18. As is well known, toggle bolt assembly 10 is inserted by passing bolt member 12 through a mounting hole (not shown) in object 20 and then threadedly engaging bolt member 12 with threaded portion 22 of toggle member 14. Wing portions 24 and 26 of toggle member 14 are then folded to a position in which the wing members extend substantially parallel with the longitudinal axis of bolt member 12, and toggle member 14 is passed through hole 16. Once toggle member 14 has completely passed through hole 16, a spring or other biasing element 28 within toggle member 14 pivots wing portions 24 and 26 to their open position, as depicted in the drawings. Bolt member 12 is then rotated relative to toggle member 14 to draw bolt member 12 further into threaded portion 22 until the toggle bolt assembly is fully installed with wing portions 24 and 26 abutting the interior surface of wall 18 and object 20 abutting the exterior surface of the wall, thereby fastening object 20 to wall 18.

Figure 2:
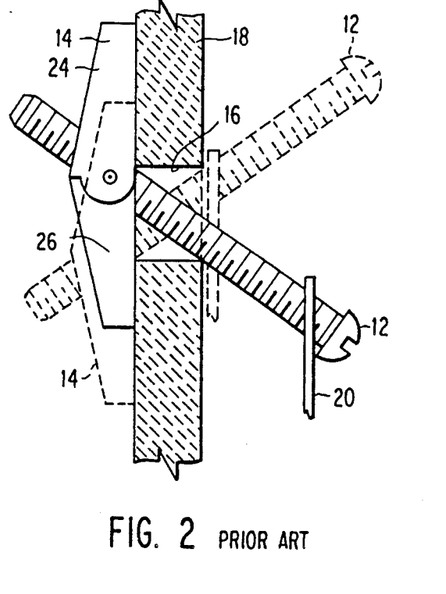

Although prior art toggle bolt assembly 10 holds object 20 substantially flush against wall 18, problems exist. In order to tighten the assembly, bolt member 12 must be pulled outwardly from wall 18 to bring wing portions 24 and 26 against the inner surface of the wall in order to inhibit rotation of toggle member 14 as bolt member 12 is rotated. Continued outward pulling of bolt member 12 during rotation is awkward and slow. As can be seen from FIG. 1, when wing portions 24 and 26 are in their folded position to pass through hole 16, toggle member 14 is larger in maximum cross-sectional dimension than is the threaded diameter of bolt member 12. Consequently, hole 16 must be considerably larger in diameter than is the threaded diameter of bolt member 12. This leaves a significant portion of the cross-section of hole 16 free, with the result that bolt member 12 can move therein unless it is tightened to hold wing portions 24 and 26 and object 20 quite snuggly against wall 18. Even when the toggle bolt assembly is tightened sufficiently to inhibit movement of bolt member 12, the bolt member can be off center within hole 16, as illustrated in FIG. 1. In addition, if object 20 does not extend above bolt 12 by an amount sufficient to cover the unfilled portion of hole 16, then some of that portion of hole 16 is visible above object 20, as also depicted in FIG. 1, significantly detracting from the aesthetics of the completed installation. Further, as can be seen from FIG. 2, the large diameter of hole 16 relative to the threaded diameter of bolt member 12 permits bolt member 12 to pivot or wobble within hole 16. Not only does this make installation of the toggle bolt assembly more difficult, as depicted in FIG. 2, but also under some circumstances the assembly may be tightened to bring wing portions 24 and 26 and object 20 flush against wall 18 while bolt member 12 is still pivoted to one of its extreme positions, rather than extending perpendicular to the surface of wall 18.

Figure 3:
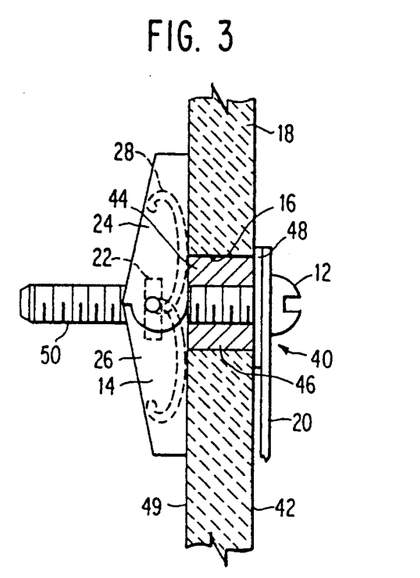
FIG. 3 is a cross-sectional view depicting a toggle bolt assembly, in accordance with one preferred embodiment of the present invention, fastened in a wall or other support member.

FIG. 3 depicts installation of an object 20 by means of one embodiment of retainer bushing in an improved toggle bolt assembly 40 in accordance with the present invention. Object 20 is fastened on the exterior surface of a wall 18 or other support member, with a cavity or open area behind the wall. Toggle bolt assembly 40 includes bolt member 12 and winged toggle member 14 having threaded portion 22 and spring-biased wing portions 24 and 26, just as in prior art toggle bolt assembly 10 of FIGS. 1 and 2. Toggle bolt assembly 40 further includes retainer bushing member 44 which has a body portion 46 and a flange portion 48.

Figure 4:
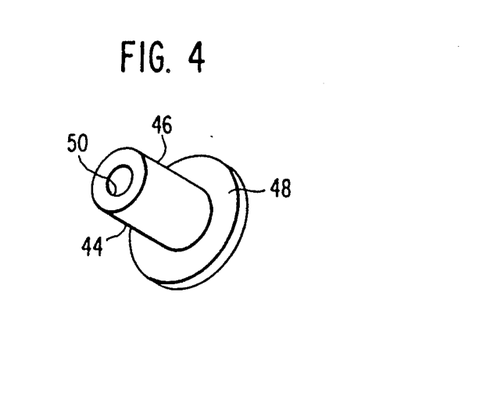
FIGS. 4 and 5 depict preferred forms of retainer bushings in accordance with the present invention, suitable for use in the toggle bolt assembly of FIG. 3.

FIG. 4 depicts one embodiment of tubular retainer bushing 44 in greater detail. The outside diameter of tubular body portion 46 is substantially the same as the diameter of hole 16 so that bushing 44 can not pivot or wobble within hole 16. Bushing 44 is inserted into hole 16 until annular flange 48 abuts the front surface 42 of wall 18. Annular flange 48 covers hole 16 to prevent bushing 40 from falling through the hole and into the cavity behind wall 18. In the preferred embodiment, annular flange 48 is integrally formed with the outside surface of body portion 46, at one axial end thereof. Further, as depicted in FIG. 3, bolt member 12 is centrally located in hole 16, and thus object 20 is more precisely positioned and is more likely to cover all of hole 16, and if object 20 does not cover all of hole 16, still flange 48 covers the hole, including any uneven edges, considerably improving the aesthetic appearance of the installation, particularly if flange 48 is the same color as exterior surface 42 of wall 18.

The inside diameter of bushing 44 is substantially the same as the external thread diameter 50 of bolt member 12. Consequently, a small amount of force is required to cause bolt 12 to pass through bushing 44. Retainer bushing 44 can be made of any suitable material such as a resilient material, for example a plastic. This snug fit prevents bolt 12 from pivoting or wobbling within bushing 44. The thickness of the cylindrical wall of body portion 46 is somewhat exaggerated in the drawings for ease of illustration.

To secure object 20 to the wall or other support member 18, hole 16 is first drilled through the wall 18 with a diameter substantially equal to the external diameter of body portion 46 of bushing 44. This diameter is greater than the largest cross-sectional dimension of toggle member 14 when wing portions 24 and 26 are folded to extend substantially parallel with the longitudinal axis of bolt member 12. Bolt member 12 is passed through a hole in object 20 and through tubular retainer bushing 44 and is threadably engaged in threaded portion 22 of winged toggle member 14. Wing portions 24 and 26 are then folded, and toggle member 14 is inserted through hole 16, following which wing portions 24 and 26 are released to open under the urging of spring 28. Retainer bushing 44 is inserted into hole 16 until flange portion 48 abuts exterior surface 42 of wall 18. Retainer bushing 44 is then held in place while bolt member 12 is pulled outward until wing portions 24 and 26 abut the inner surface 49 of wall 18. Retainer bushing 44 is then released and yet wing portions 24 and 26 continue to abut inner surface 49 of wall 18 as bolt member 12 is rotated, reducing or eliminating rotation of winged toggle member 14 as bolt member 12 is threadedly tightened to draw object 20 and wing portions 24 and 26 securely against the surfaces 42 and 49 of the wall or other support member 18.

Because the external diameter of body portion 46 is substantially the same as the diameter of hole 16, bushing 44 is held snuggly within hole 16, without significant pivoting or wobbling and is substantially centered within the hole. Similarly, because the external diameter of bolt member 12 is substantially the same as the internal diameter of bushing 44, bolt member 12 is held snuggly without significant pivoting or wobbling and is substantially centered therein and thus within hole 16. Preferably body portion 46 of bushing 44 has a length substantially equal to or less than the thickness of wall 18. By making the length of body portion 46 substantially the same as the thickness of wall 18, the stability of the toggle bolt assembly, with minimum pivoting or wobbling, is enhanced.

Assembly 40 further facilitates installation of larger objects requiring more than one toggle bolt assembly to fasten the object to the wall. Each bushing 44 retains its respective bolt 12 in a substantially perpendicular alignment with respect to wall 18 and substantially centered within a hole 16. Since all bolts are precluded from both radial and pivotal motion, installation of the object is accomplished merely by tightening each bolt without need for readjustment of the object and the toggle bolts due to radial or pivotal motion by one or more of the toggle bolt assemblies.

Figure 5:
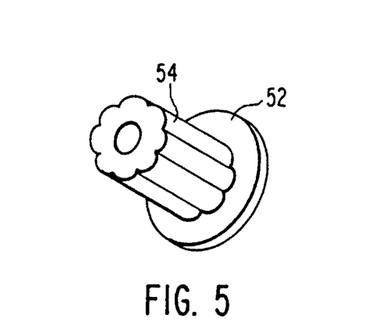
Figure 6:
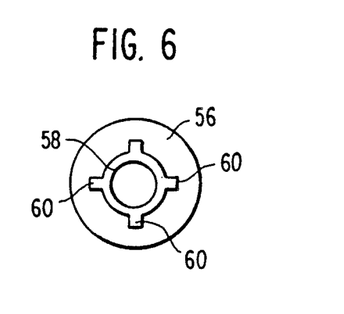
FIG. 6 is an end elevational view of another embodiment of retainer bushing suitable for use in a toggle bolt assembly in accordance with the present invention.
Figure 7:
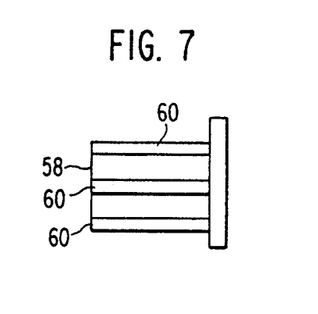
FIG. 7 is a side elevational view of the retainer bushing of FIG. 6.

FIG. 5 depicts an alternative embodiment of bushing member 52 which differs from bushing member 44 of FIG. 4 in that body portion 54 of bushing 52 is longitudinally fluted. FIGS. 6 and 7 depict another embodiment of bushing member 56 in which body portion 58 is provided with a number of radially outwardly extending ribs 60 running longitudinally over the length thereof. In each bushing member 44, 52, and 56, the maximum cross-sectional dimension of the body portion is substantially the same as the diameter of the mounting hole 16 in the wall or other support member 18. That is, diameter of bushing member 44, the maximum dimension across the flutes of bushing 52, and the maximum dimension across the ribs 60 of bushing 56 are each substantially equal to the diameter of mounting hole 16. Bushing members 44, 52, and 56 can, of course, be made in various sizes, both diameter and length, for various applications.

Figure 8:
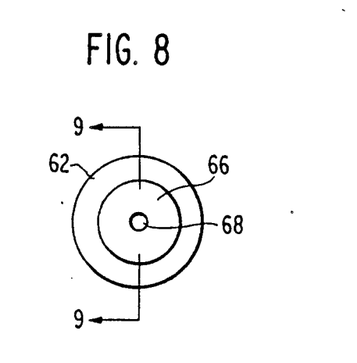
FIG. 8 is an end elevational view of a further embodiment of a retainer bushing suitable for use in a toggle bolt assembly in accordance with the present invention.
Figure 9:
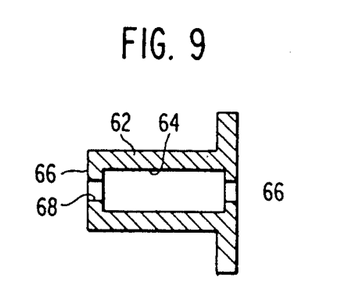
FIG. 9 is a sectional view taken along line 9—9 of FIG. 8.
Figure 10:
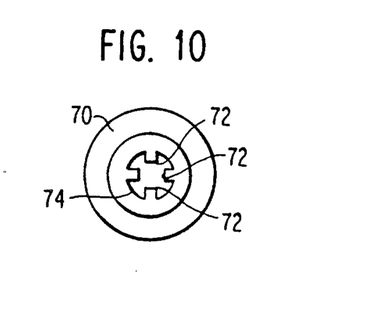
FIG. 10 is an end elevational view of yet another embodiment of retainer bushing suitable for use in a toggle bolt assembly in accordance with the present invention.

FIGS. 8 and 9 depict a further embodiment of bushing member 62. A radially inwardly extending flange or lip 66 is provided at either or both ends of central bore 64. The central hole 68 of each flange 66 is of a diameter substantially equal to the root diameter of threaded bolt member 12 to fit within the thread of bolt member 12 so that bolt member 12 can be inserted through bushing member 62 either by pushing bolt member 12 to flex the flanges 66 or by threading bolt member 12 through holes 68 and central bore 64. FIG. 10 depicts yet another embodiment of bushing member 70 having a number of fingers 72 projecting into central bore 74 at either or both ends thereof. Like flanges 66, fingers 72 leave a central hole of a minimum diameter substantially equal to the root diameter of bolt member 12 so that fingers 72 fit within the threads of bolt member 12 which is either pushed or threaded past fingers 72 and through central bore 74.

Figure 11:
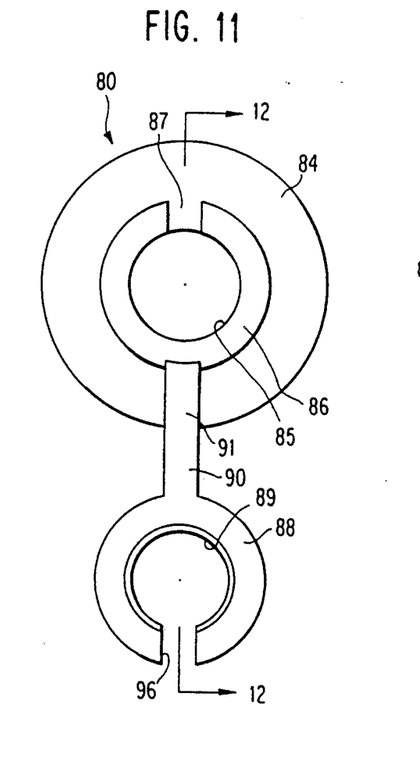
FIG. 11 is an end elevational view of another embodiment of retainer bushing in accordance with the present invention.
Figure 12:
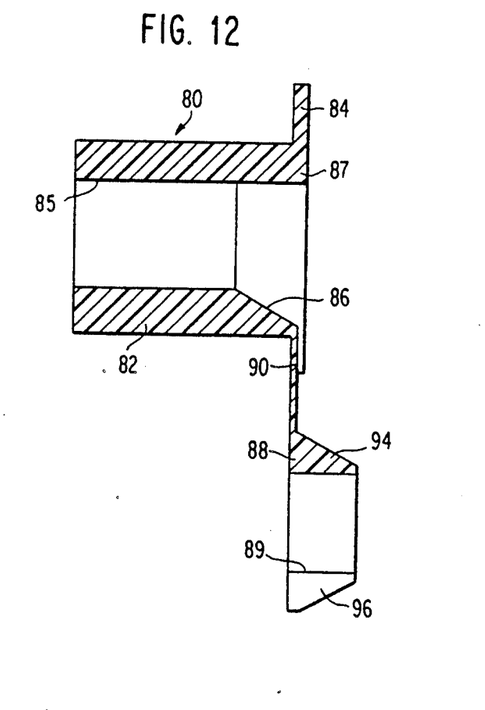
FIG. 12 is a sectional view taken along line 12—12 of FIG. 11.

FIGS. 11-14 depict yet another embodiment of bushing member 80 in accordance with the present invention. Bushing member 80 includes a tubular body portion 82, a flange portion 84, and a collar portion 88 which is connected to flange portion 84 by flexible connecting portion 90. Connecting portion 90 might have a thickness one-half the thickness of flange portion 84, as can be seen in FIG. 12. Flange 84 includes a recess 91 of the same width as connecting portion 90 and of a depth substantially equal to the thickness of connecting portion 90.

As depicted in FIGS. 11 and 12, except for a narrow lip 87 directly opposite connecting portion 90, central bore 85 of tubular body portion 82 includes an enlarged portion 86 formed by tapering the central bore radially outwardly so that the central bore has a larger diameter adjacent flange 84 than at the opposite end of tubular body portion 82.

Collar portion 88 is substantially circular, except that opposite connecting portion 90 the collar portion has a discontinuity or open entry area 96 of substantially the same width as lip 87. As seen in FIG. 12, one side of collar portion 88 includes tapered surfaces 94 having a taper substantially the same as that of enlarged portion 86. Collar portion 88 has a central opening 89 of a diameter equal to or slightly less than the external thread diameter of bolt member 12 so that bolt member 12 does not slide freely through collar member 88 but can be drawn through as the bolt member is drawn into the threaded toggle member 14. Connecting portion 90 is flexible so that collar portion 88 can be moved from the position depicted in FIG. 12 to the restraining position depicted in FIG. 13 in which collar portion 88 is seated within enlarged portion 86 with lip 87 within discontinuity 96.

Figure 14:
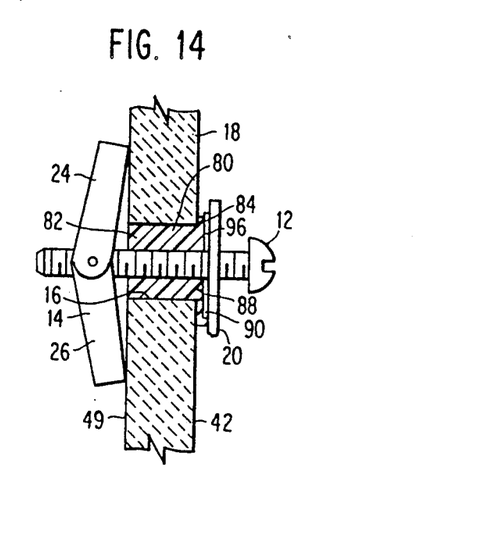
FIG. 14 is a sectional view taken along line 14—14 of FIG. 13 but depicting a partially installed toggle bolt assembly utilizing the retainer bushing of FIG. 13.
Figure 15:
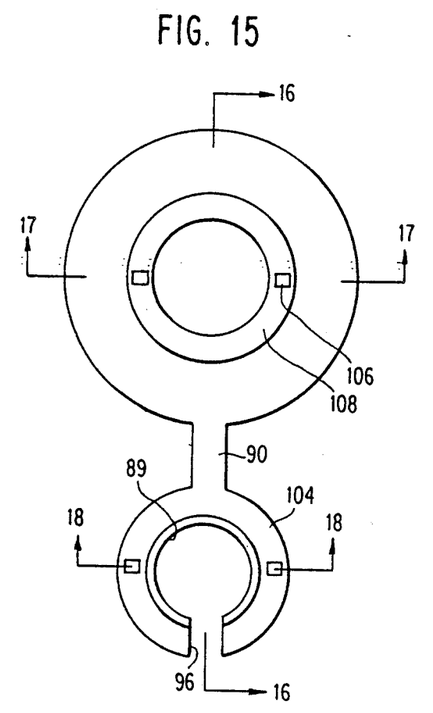
FIG. 15 is an end elevational view of yet another embodiment of retainer bushing in accordance with the present invention.
Figure 16:
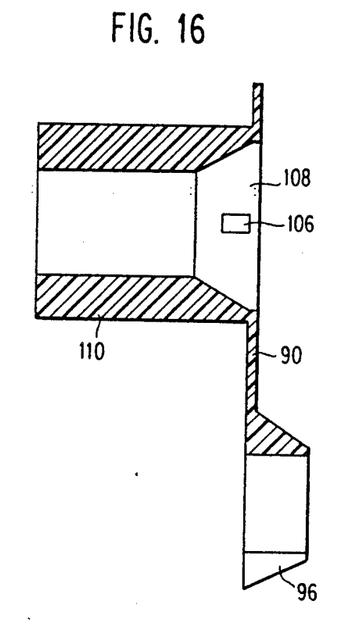
FIGS. 16, 17, and 18 are sectional views taken along lines 16—16, 17—17, and 18—18, respectively, of FIG. 15.
Figure 17:
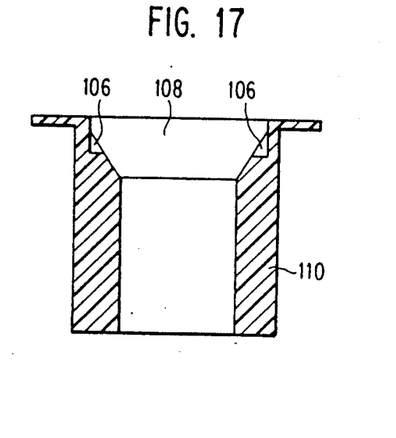
Figure 18:
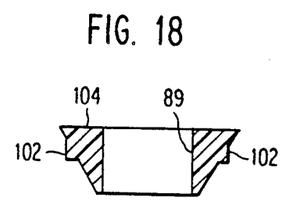
Figure 19:
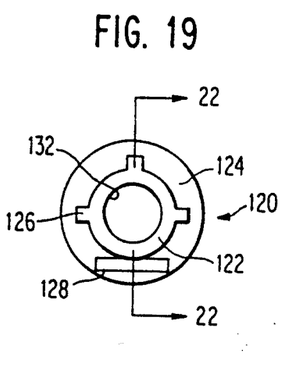
FIG. 19 is an end elevational view of still another embodiment of retainer bushing in accordance with the present invention.
Figure 20:
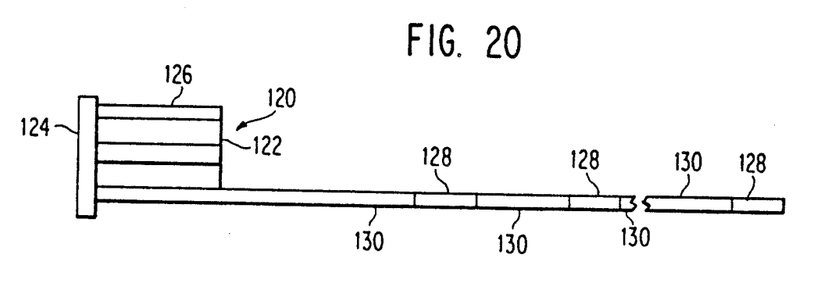
FIGS. 20 and 21 are, respectively, a side elevational view and a top plan view of the retainer bushing of FIG. 19.
Figure 21:
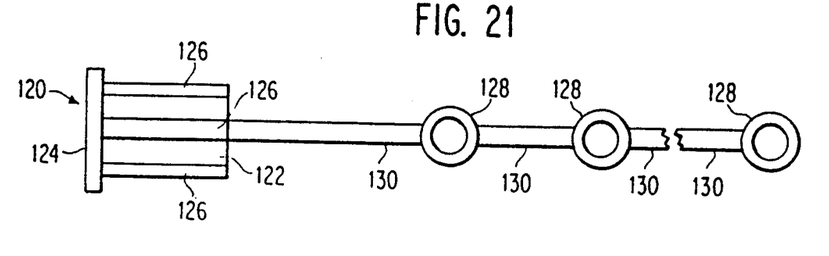

FIG. 14 illustrates the installation of object 20 by means of a toggle bolt assembly including bushing member 80. As can be seen, threaded bolt member 12 is passed through an opening (not shown) in object 20 and is then passed through tubular body portion 82 of bushing member 80. Toggle assembly 14 is threaded onto the end of threaded bolt member 12. Wing portions 24 and 26 are folded down and inserted through hole 16 in wall 18. After the toggle member 14 is clear of wall 18, the wings 24 and 26 are biased open. Tubular body portion 82 is inserted into hole 16 until flange portion 84 abuts exterior surface 42 of wall 18, and bolt member 12 is pulled outward to bring wing portions 24 and 26 into contact with interior surface 49 of wall 18. Collar portion 88 is then folded to the restraining position, and flexed to permit threaded bolt member 12 to pass through discontinuity 96, fitting collar portion 88 about threaded bolt member 12. Collar portion 88 is then inserted into enlarged portion 86 of tubular body member 82, with discontinuity 96 around lip 87. The thickness of connecting portion 90 and the depth of recess 91 result in the folded connecting portion being substantially flush with the outer surface of flange portion 84, as seen from FIG. 14. Collar portion 88 prevents bolt member 12 from sliding freely through bushing member 80, thus retaining wing portions 24 and 26 in contact with interior surface 49 of wall 18 to inhibit rotation of toggle member 14. Bolt member 12 can thus be driven by means of a powered screwdriver, a Yankee screwdriver, a powerdriver, or other device exerting a force urging the head of bolt member 12 toward exterior surface 42 of wall 18 while rotating the bolt member. As a consequence, bolt member 12 is threadedly drawn into toggle member 14 and thus into retainer bushing 80, mounting object 20 on wall 18.

Figure 13:
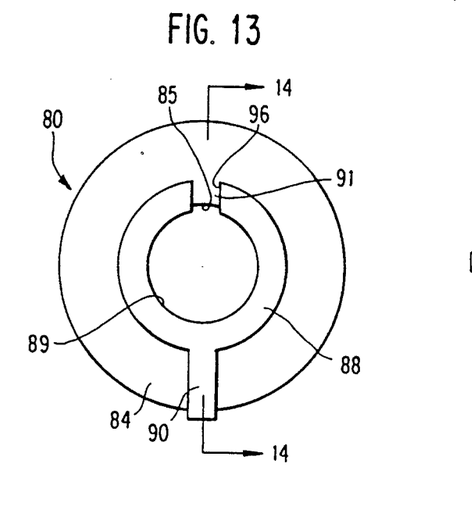
FIG. 13 is an end elevational view of the retaining bushing of FIG. 11 but in the position in which it is used.

If it is desired to remove the toggle bolt assembly of FIG. 14, bolt member 12 is rotated to withdraw the bolt member slightly from toggle member 14 and bushing 80, collar portion 88 is moved from the restraining position of FIG. 13 to the position of FIGS. 11 and 12, bolt member 12 is fully unscrewed from toggle member 14 which then falls clear, and bolt member 12 and retainer bushing 80 are withdrawn from mounting hole 16.

FIGS. 15-18 depict a modified embodiment of retainer bushing which differs from the embodiment shown in FIGS. 11-14 by the inclusion of projections 102 on collar 104 and recesses 106 on enlarged portion 108 of cylindrical body portion 110. When collar 104 is in its restraining position within enlarged portion 108, projections 102 fit within recesses 106 to inhibit collar 104 from rotating within cylindrical body portion 110. If desired a lip 87 can be provided to engage discontinuity 96, just as in the embodiment of FIGS. 11-14.

FIGS. 19-22 depict still another embodiment of retainer bushing in accordance with the present invention. Bushing 120 includes a tubular body portion 122, flange portion 124, and ribs 126, similar to retainer bushing 56 of FIGS. 6 and 7. Retainer bushing 120 additionally includes several restraint loops 128 which are connected to tubular body portion 122 by flexible connecting portion 130. While retainer bushing 120 could have a single restraint loop 128, the retainer bushing is usable in a toggle bolt assembly for attaching objects to walls or other support members of various thicknesses if several restraint loops 128 are provided at different distances from tubular body portion 122, permitting the user to select the appropriate loop for the particular application. Each restraint loop 128 has an internal diameter permitting the loop to fit freely but snuggly over the threaded end of threaded bolt member 12.

Figure 22:
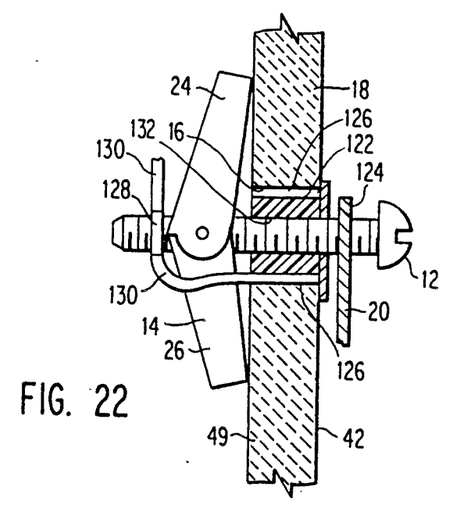
FIG. 22 is a sectional view taken along line 22—22 of FIG. 19 but depicting a partially installed bolt assembly utilizing the retainer bushing of FIG. 19.

As illustrated in FIG. 22, to mount an object 20 on wall 18, threaded bolt member 12 is passed through an opening (not shown) in the object, through central bore 132 of retainer bushing 120, threaded through toggle assembly 14, and passed through a loop 128. The loop 128 and toggle assembly 14 are then inserted through the hole 16 in wall 18, permitting wing portions 24 and 26 to open, and tubular body portion 122 is inserted into opening 16. As pressure is exerted on the head of bolt member 12 to urge the bolt head toward the exterior surface 42 of wall 18, restraint loop 128 limits longitudinal movement of the bolt member and toggle member 14 since it maintains toggle member 14 within a predetermined distance from retainer bushing 120. Connecting portion 130 inhibits rotation of toggle member 14, so it is not necessary that wing portions 24 and 26 remain in contact with interior surface 49 of wall 18. Accordingly, bolt member 12 can be driven by a powered screwdriver.

If it is desired to remove the toggle bolt assembly of FIG. 22, bolt member 12 is unscrewed from toggle member 14 which falls clear, and bolt member 12 and retainer bushing 120 are withdrawn from hole 16.

Either the restraint collar 88 or 104 and the enlarged portion 86 or 108 or the restraint loops 128 can be used with cylindrical body portions of any exterior shape. If desired, the body portion of any of the bushing members can be tapered over part of the length thereof from a smaller diameter at the extreme end thereof to a larger diameter adjacent the flange portion to aid insertion of the bushing member when its body portion is sized to frictionally engage the sidewall of mounting hole 16 to inhibit rotation of the bushing member.

Although the present invention has been described with reference to preferred embodiments, rearrangements and modifications might be made within the scope of the invention.

What is claimed is:

1. A toggle bolt assembly for fastening an object to one surface of a wall or other support member having an open area on the side of the wall opposite the one surface, the wall having a hole therethrough of a first specified diameter for receipt of the toggle bolt assembly, said toggle bolt assembly comprising:
   a threaded bolt member having a length greater than the thickness of the wall and a diameter of a second specified diameter;
   a toggle member including a threaded retainer portion adapted to threadedly engage the threaded bolt member, a pair of toggle wings pivotally mounted to extend from said threaded retainer portion, and biasing means normally biasing said wings to an open position in which said wings extend substantially normal to the axis of said threaded bolt member when said threaded retainer portion is threadedly engaging said threaded bolt member, said wings pivotal to a folded position in which said wings extend substantially parallel to said last-named axis, said wings in their open position having a wingspan greater than said first specified diameter, said toggle member being sized, with said wings in their folded position, to have a maximum cross-sectional dimension less than the first specified diameter, and
   a busing member having a tubular body portion with a maximum outside cross-sectional dimension substantially the same as the first specified diameter, an outer end, an inner end, and a central bore with an inside diameter substantially the same as the second specified diameter, permitting said bushing member to fit snuggly upon said threaded bolt member, said bushing member further having a flange portion extending radially outwardly from said body portion outer end, a connecting strap fixedly connected to and extending from said body portion inner end, and at least one restraining loop connected to said connecting strap;
   whereby with said threaded bolt member passed through an opening in an object and through said bushing member central bore and threadedly engaging said threaded retainer portion, with one of said at least one restraining loops looped over the end of said threaded bolt member, and with said toggle wings in their folded position, said looped restraining loop and said toggle member can be passed through the hole in the wall and said bushing member inserted into such hole until said flange portion engages the one surface of the wall, and when said toggle wings are through the hole and are biased to pivot to their open position, said connecting strap and looped restraining loop cooperate to restrain rotation of said toggle member, and said threaded bolt member can then be rotated to draw said bolt member further into said threaded retainer portion, causing said wings to further engage the other surface of the wall and bringing the object substantially to the one surface of the wall and so fastening the object to the wall.

2. A toggle bolt assembly as claimed in claim 1 wherein said tubular body portion has a length not greater than the thickness of the wall.

3. A toggle bolt assembly as claimed in claim 1 in which said tubular body portion has a substantially circular external cross-section.

4. A toggle bolt assembly as claimed in claim 1 in which said tubular body portion has a longitudinally fluted external cross-section.

5. A toggle bolt assembly as claimed in claim 1 in which said tubular body portion has a main portion with a substantially circular external cross-section and a plurality of radially outwardly extending ribs running longitudinally over the length of said main portion.

6. A toggle bolt assembly as claimed in claim 1 in which said tubular body portion includes a radially inwardly extending flange at one end of the central bore.

7. A toggle bolt assembly as claimed in claim 6 in which said inwardly extending flange has a length in the radial direction of said bushing member leaving a central opening of a diameter substantially equal to the root diameter of said bolt member and a thickness in the longitudinal direction of said bushing member permitting said flange to fit within the threads of said bolt member.

8. A toggle bolt assembly as claimed in claim 1 in which said tubular body portion includes a radially inwardly extending flange at each end of the central bore.

9. A toggle bolt assembly as claimed in claim 8 in which each of said inwardly extending flanges has a length in the radial direction of said bushing member leaving a central opening of a diameter substantially equal to the root diameter of said bolt member and a thickness in the longitudinal direction of said bushing member permitting said flanges to fit within the threads of said bolt member.

10. A toggle bolt assembly as claimed in claim 1 in which said tubular body portion includes a plurality of radially inwardly extending fingers at one end of the central bore.

11. A toggle bolt assembly as claimed in claim 10 in which said fingers have a length in the radial direction of said bushing member leaving a central opening of a minimum cross-sectional dimension substantially equal to the root diameter of said bolt member and a thickness in the longitudinal direction of said bushing member permitting said fingers to fit within the threads of said bolt member.

12. A toggle bolt assembly as claimed in claim 1 in which said tubular body portion includes a plurality of radially inwardly extending fingers at each end of the central bore.

13. A toggle bolt assembly as claimed in claim 12 in which the fingers at each end of the central bore have a length in the radial direction of said bushing member leaving a minimum cross-sectional dimension substantially equal to the root diameter of said bolt member and a thickness in the longitudinal direction of said bushing member permitting said fingers to fit within the threads of said bolt member.

14. A toggle bolt assembly as claimed in claim 1 wherein said bushing member includes a plurality of said restraining loops.

15. A bushing member adapted for use with a conventional toggle bolt to form a toggle bolt assembly for fastening an object to one surface of a wall or other support member having an open area on the side of the wall opposite the one surface, the wall having a hole therethrough of a first specified diameter for receipt of the toggle bolt assembly, said bushing member comprising a tubular body portion with a maximum outside cross-sectional dimension substantially the same as the first specified diameter, an outer end, an inner end, and a central bore with an inside diameter of a second specified diameter; a flange portion extending radially outwardly from said body portion outer end; a connecting strap fixedly connected to and extending from said body portion inner end; and at least one restraining loop connected to said connecting strap;

said bushing member adapted for use with a conventional toggle bolt including (a) a threaded bolt member having a length greater than the thickness of the wall and a diameter substantially the same as the second specified diameter, permitting the bolt member to pass through said bushing member central bore to snuggly retain said bushing member thereon, and (b) a toggle member including a threaded retainer portion adapted to threadedly engage the threaded bolt member, a pair of toggle wings pivotally mounted to extend from the threaded retainer portion, and biasing means normally biasing the wings to an open position in which the wings extend substantially normal to the axis of the threaded bolt member when the threaded retainer portion is threadedly engaging the threaded bolt member, the wings pivotal to a folded position in which the wings extend substantially parallel to the last-named axis, the wings in their open position having a wingspan greater than the first specified diameter, the toggle member being sized, with the wings in their folded position, to have a maximum cross-sectional dimension less than the first specified diameter;

whereby with the threaded bolt member passed through an opening in an object and through said bushing member central bore and threadedly engaging the threaded retainer portion, with one of the at least one restraining loops looped over the end of the threaded bolt member, and with the toggle wings in their folded position, said looped restraining loop and the toggle member can be passed through the hole in the wall and said bushing member inserted into such hole until said flange portion engages the one surface of the wall, and when the toggle wings are through the hole and are biased to pivot to their open position, said connecting strap and looped restraining loop cooperate to restrain rotation of the toggle member, and the threaded bolt member can then be rotated to draw the bolt member further into the threaded retainer portion, causing the wings to further engage the other surface of the wall and bringing the object substantially to the one surface of the wall and so fastening the object to the wall.

16. A bushing member as claimed in claim 15 wherein said tubular body portion has a length not greater than the thickness of the wall.

17. A bushing member as claimed in claim 15 in which said tubular body portion has a substantially circular external cross-section.

18. A bushing member as claimed in claim 15 in which said tubular body portion has a longitudinal fluted external cross-section.

19. A bushing member as claimed in claim 15 in which said tubular body portion has a main portion with a substantially circular external cross-section and a plurality of radially outwardly extending ribs running longitudinally over the length of said main portion.

20. A bushing member as claimed in claim 15 in which said tubular body portion includes a radially inwardly extending flange at one end of the central bore.

21. A bushing member as claimed in claim 20 in which said inwardly extending flange has a length in the radial direction of said bushing member leaving a central opening of a diameter substantially equal to the root diameter of the bolt member and a thickness in the longitudinal direction of said bushing member permitting said flange to fit within the threads of the bolt member.

22. A bushing member as claimed in claim 15 in which said tubular body portion includes a radially inwardly extending flange at each end of the central bore.

23. A bushing member as claimed in claim 22 in which each of said inwardly extending flanges has a length in the radial direction of said bushing member leaving a central opening of a diameter substantially equal to the root diameter of the bolt member and a thickness in the longitudinal direction of said bushing member permitting said flanges to fit within the threads of the bolt member.

24. A bushing member as claimed in claim 15 in which said tubular body portion includes a plurality of radially inwardly extending fingers at one end of the central bore.

25. A bushing member as claimed in claim 24 in which said fingers have a length in the radial direction of said bushing member leaving a central opening of a minimum cross-sectional dimension substantially equal to the root diameter of the bolt member and a thickness in the longitudinal direction of said bushing member permitting said fingers to fit into the threads of said bolt member.

26. A bushing member as claimed in claim 15 in which said tubular body portion includes a plurality of radially inwardly extending fingers at each end of the central bore.

27. A bushing member as claimed in claim 26 in which the fingers at each end of the central bore have a length in the radial direction of said bushing member leaving a central opening of a minimum cross-sectional dimension substantially equal to the root diameter of the bolt member and a thickness in the longitudinal direction of said bushing member permitting said fingers to fit within the threads of the bolt member.

28. A bushing member as claimed in claim 15 wherein said restraining portion includes a plurality of said loop members.

* * * * *